Jan. 3, 1967 T. J. MALOTT 3,295,551

VALVE

Filed July 17, 1964

INVENTOR
THOMAS J. MALOTT

BY Dodge and Sons
ATTORNEYS

3,295,551
VALVE
Thomas J. Malott, Kalamazoo, Mich., assignor to The New York Air Brake Company, a corporation of New Jersey
Filed July 17, 1964, Ser. No. 383,383
7 Claims. (Cl. 137—596)

This invention relates to hydraulic control valves, and particularly to control valves for power steering circuits requiring relatively low flow rates, i.e., flow rates on the order of ten gallons per minute.

A known power steering system for vehicles includes a power pump which is driven by the propulsion engine, a reversible hand pump which is actuated by the operator through the steering wheel, a double-acting ram for turning the ground-engaging wheels, and a steering control valve. The control valve is shiftable in opposite directions from a neutral position, in which it usually unloads the power pump, to connect the power pump to one side of the hand pump, to connect the other side of the hand pump to a selected side of the ram, and to connect the opposite side of the ram to tank. In addition to these switching functions, the control valve also performs flow metering functions. Because of these demands imposed upon it, the control valve is inherently rather complex. Furthermore, since the switching functions must be completed before any flow metering can be accomplished, the valve introduces a substantial amount of lost motion into the steering circuit. Finally, in many of the prior steering control valves, the dynamic flow forces developed on the movable valve element coact with the applied forces to produce relaxation oscillations that cause instability.

The object of this invention is to provide an improved steering control valve which has a relatively simple and stable movable control element, which introduces no lost motion into the steering circuit, and which requires neither a mechanical connection with the steering wheel nor a feedback connection with the ram.

The preferred embodiment of the invention is described herein in detail with reference to the accompanying drawing in which.

Figure 1:
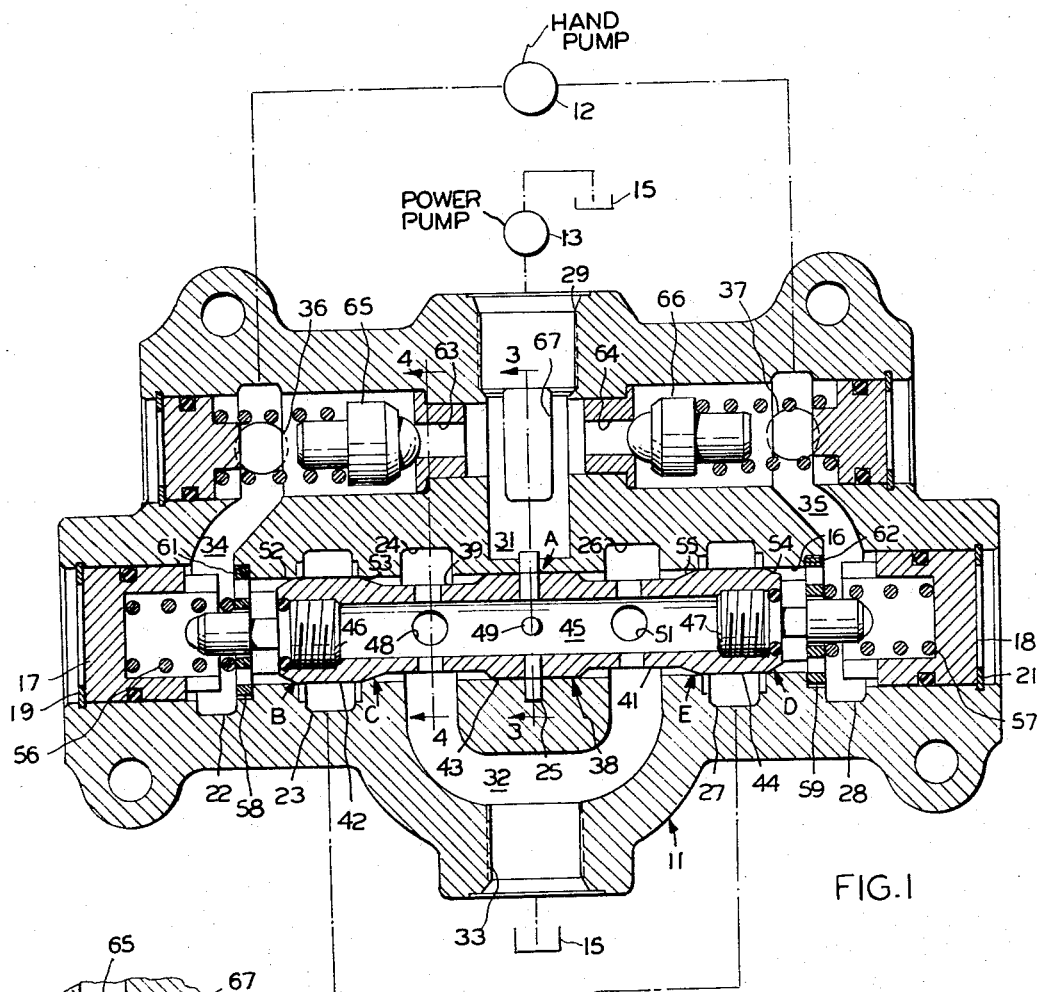
FIG. 1 is a sectional view of the steering control valve including, in schematic form, the various system components with which it is used.
Figure 3:
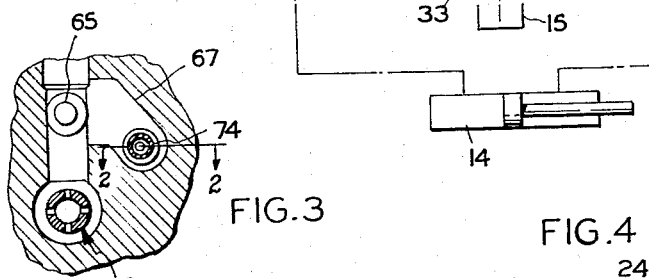
Figure 4:
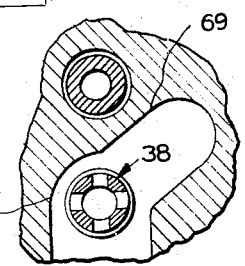

FIGS. 3 and 4 are sectional views, on reduced scales, taken on lines 3—3 and 4—4, respectively, of FIG. 1.

As shown in FIG. 1, the improved control valve 11 is incorporated in a steering circuit including a reversible hand pump 12 which is driven by the operator's steering wheel (not shown), a fixed displacement power pump 13 which is driven by the engine, a double-acting ram 14 which turns the ground-engaging wheels, and a hydraulic reservoir or tank 15. The valve 11 comprises a housing containing a through bore 16 whose opposite ends are closed and sealed by plugs 17 and 18 which are held in place by snap rings 19 and 21, respectively, and which is encircled by seven annular chambers 22–28. Annular chamber 25 communicates with the inlet port 29 through a supply passage 31, annular chambers 24 and 26 are joined together by a manifold 32 leading to exhaust port 33, and annular chambers 22 and 28 are connected by cored passages 34 and 35, respectively, with the two control ports 36 and 37. The remaining annular chambers 23 and 27 communicate with a pair of motor or service ports (not shown).

Valve bore 16 contains a sliding valve plunger or spool 38 formed with a pair of annular grooves 39 and 41 that define three valve lands 42–44, and contains an axial bore 45 whose opposite ends are closed and sealed by the threaded plugs 46 and 47. Axial bore 45 is intersected by three sets of radial passages 48, 49 and 51; the passages 49 registering with annular chamber 25 when spool 38 is in the illustrated neutral position and defining therewith a metering orifice A, and the passages 48 and 51 being in substantially free communication with annular chambers 24 and 25, respectively, in all positions of the spool. The ratio of length-to-width for each of the flow paths defined by chamber 25 and radial passages 49 is at least one, and in the illustrated embodiment is three, so that the direction of flow through each path is substantially normal to the longitudinal axis of the spool 38. This arrangement eliminates, or at least minimizes, the dynamic flow force at orifice A.

At its left and right sides land 42 is provided with a series of circumferentially spaced, inclined metering flats 52 and 53, respectively, which, with the wall of bore 16, define metering orifices B and C. Land 44 is provided with similar flats 54 and 55 that define metering orifices D and E. These flats are so dimensioned that the flow areas of the orifices vary linearly with movement of spool 38. In the illustrated embodiment, the flow area of each of the orifices B, C, D and E is zero when spool 38 is in neutral position so that the ram connected with motor chambers 23 and 27 is hydraulically locked. However, this is not essential. In some installations it is desirable that the external loads acting on ram 14 be felt by the operator through the steering wheel, and in these cases the orifices B and D are open slightly when spool 38 is in neutral position. In other cases, all four orifices are partially open when spool 38 is in neutral position so that the wheels can turn rather freely under the action of external loads.

Valve spool 38 is biased to its neutral position by a pair of coil compression springs 56 and 57 seated in the plugs 17 and 18, respectively, and reacting against the perforated washers 58 and 59 that encircle the small diameter outer ends of plugs 46 and 47, respectively. When spool 38 is in that position, the washers 58 and 59 rest against the annular shoulders 61 and 62 defined by the counterbores at the opposite ends of bore 16. Movement of the spool 38 in reverse directions from the neutral position is effected by the differential between the pressures in control chambers 22 and 28 which act upon its opposite ends.

Figure 2:
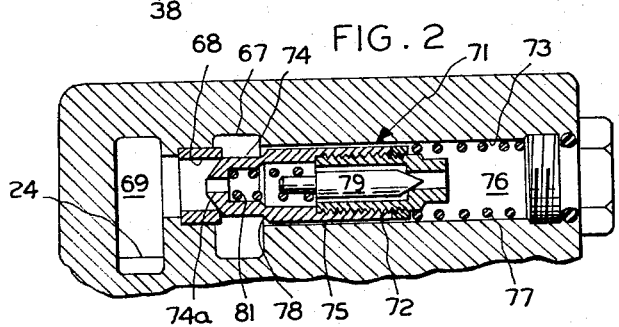
FIG. 2 is a sectional view, on enlarged scale, taken on line 2—2 of FIG. 3.

The supply passage 31 is connected with the control ports 36 and 37 by branch passages 63 and 64 containing check valves 65 and 66, respectively. As shown in FIGS. 2, 3 and 4, the supply passage 31 also communicates with the exhaust chamber 24 through a path including cored passage 67, bore 68, and cored passage 69 and which is controlled by a combination check and relief valve unit 71. This unit includes a tubular body 72 which is slidable in bore 73 and which carries a valve head 74 that cooperates with a seat encircling the right end of bore 68. On its outer periphery, body 72 carries a plurality of longitudinally extending restricted slots 75 which connect cored passage 67 with the space 76 at the right end of bore 73. The valve head 74 is biased toward its seat by coil compression spring 77 and by the fluid pressure in space 76, and is urged in the opening direction by tank pressure which acts upon its nose 74a and by the pressure in cored passage 67 that acts upon the annular area 78 bounded by the bores 68 and 73. Located within the tubular body 72 is a relief poppet 79 which responds to the pressure differential between space 76 and tank and is biased closed by coil compression spring 81.

When the valve 11 is in use, its ports are connected with the pumps 12 and 13, the ram 14 and the tank 15 in the manner shown in FIG. 1. With the hand pump 12 at rest, the pressures in control chambers 22 and 28 are equal so check valves 65 and 66 are closed and centering springs 56 and 57 hold valve spool 38 in its illustrated neutral position. Therefore, the oil delivered to inlet port 29 from power pump 13 returns to tank 15 along an unloading path including supply passage 31, annular chamber 25, radial passages 49, axial bore 45, radial passages 48 and 51, annular chambers 24 and 26, manifold 32 and exhaust port 33. At this time, check and relief valve unit 71 is closed.

When the operator rotates the steering wheel in a direction to turn the ground-engaging wheels to the right, hand pump 12 commences to discharge fluid to control port 37 and to withdraw fluid from control port 36. This action raises the pressure in passage 25 and in chamber 28 and reduces the pressure in passage 34 and in chamber 22, and, therefore, check valve 65 opens to transmit a portion of the output of pump 13 to the inlet of pump 12 and spool valve 38 shifts to the left against the bias of spring 56. Movement of the valve spool in this direction opens orifices D and C and allows the fluid discharged by pump 12 to flow to the rod end of ram 14 and permits the fluid discharged from the head end of this ram to flow to tank 15 along a path including annular chamber 23, orifice C, plunger groove 39, annular chamber 24, manifold 32 and exhaust port 33. Simultaneously, this movement of valve spool 38 reduces the flow area of orifice A thereby raising the pressure in supply passage 31 and also in the entire circuit from this passage to the rod end of ram 14 through hand pump 12, control port 37, control chamber 28, and orifice D. The rate at which the operator moves the steering wheel determines the rate of discharge from hand pump 12, the pressure differential between control chambers 28 and 22, and the distance spool valve 38 shifts. Consequently, the pressure level in the steering circuit depends upon the speed at which the steering wheel is moved. When the ground-engaging wheels have been turned through the desired angle, the steering wheel and hand pump 12 are brought to rest. At this time the pressures in the control ports 36 and 37 and in the control chambers 22 and 28 again equalize so that check valve 65 closes and spring 56 shifts spool valve 38 back to its illustrated neutral position. When the spool valve reaches this position, lands 42 and 44 will again isolate motor chambers 23 and 27 and thus hydraulically lock ram 14.

In order to turn the wheels in the opposite direction, the operator reverses the direction of rotation of the steering wheel and causes hand pump 12 to withdraw fluid from control port 37 and to discharge it into control port 36. In this case, check valve 66 opens and, since the pressure in chamber 22 is now higher than the pressure in chamber 28, valve spool 38 shifts to the right from the illustrated position. The metering orifices B and E are now opened so that the oil discharged by the hand pump 12 is delivered to the head end of ram 14 and the fluid displaced from the rod end of the ram is delivered to tank 15. As in the previous case, movement of the valve spool away from the neutral position reduces the flow area of orifice A and increases the pressure in the hand pump circuit.

The maximum pressure in the steering system is determined by the spring 81 associated with relief poppet 79. If this limiting pressure is exceeded, the relief poppet 79 will open and allow fluid to flow from space 76 to tank 15 through bore 68, cored passage 69, annular chamber 24, exhaust manifold 32 and exhaust port 33. Since the longitudinal slots 75 constitute flow restrictions, the pressure in space 76 drops below the pressure in cored passage 67 as soon as the poppet opens. As a result, the shifting force developed on annular surface 78 by the pressure in cored passage 67 causes the tubular body 72 to move valve head 74 away from its seat. The opening of this relief path of much larger flow area quickly dissipates the excessive pressure. When system pressure has been restored to the desired maximum, relief poppet 79 closes, the pressures in cored passage 67 and space 76 equalize, and spring 77 moves valve head 74 back into engagement with its seat.

The inclusion of the check valve in unit 71 permits manual steering at times when power pump 13 is locked or the conduit connecting this pump with inlet port 29 is blocked. Under these conditions, actuation of the hand pump 12 will cause the pressure in supply passage 31 and in cored passage 67 and space 76 to decrease below the prevailing tank pressure. As a result, the tank pressure in bore 68 acting upon the nose 74a of valve 74 opens this valve against the opposing bias of spring 77 and allows oil to flow from tank 15 to the supply passage 31 through exhaust port 33, manifold 32, annular chamber 24, cored passage 69, bore 68, and cored passage 67. This oil is then delivered through one or the other of the check valves 65 and 66 to the inlet side of the hand pump.

It will be noticed that since hand pump 12 cannot be operated unless valve spool 38 moves away from its neutral position and opens either orifice B or orifice D, and that any movement of the valve spool from the neutral position is accompanied by throttling action at orifice A as well as at either orifices B and E or C and D, the illustrated steering circuit has no lost motion. It also will be observed that since orifice A is the only metering point at which the flow rates and flow velocities are high enough to produce dynamic flow forces which could cause instability, and this orifice permits flow only in a direction substantially normal to the axis of the valve spool, these dynamic flow forces are either eliminated completely or are so small that they do not have any effect upon the shifting movement of the valve spool. This insures stability of the spool and of the ram 14 which it controls.

As stated previously, the drawing and description relate merely to the preferred embodiment of the invention. Since changes can be made in the structure of the embodiment without departing from the inventive concept, the following claims should provide the sole measure of the scope of the invention.

What I claim is:
1. A valve comprising
  a. a housing containing an inlet passage, an exhaust passage, first and second motor passages, and first and second control passages;
  b. first and second check valves arranged to permit flow from the inlet passage to the first and second control passages, respectively, and to block flow from the control passages to the inlet passage;
  c. a valve member movable in first and second opposite directions from a neutral position;
  d. centering spring means biasing the valve member to the neutral position;
  e. means carried by the valve member and the housing defining a flow connection between the inlet and exhaust passages containing a first variable area orifice, the area of the orifice being a maximum when the valve member is in neutral position and being reduced progressively as the valve member moves away from neutral position in either of said opposite directions;
  f. means carried by the valve member and the housing defining a flow connection between the first control passage and the first motor passage containing a second variable area orifice and defining a flow connection between the second control passage and the second motor passage containing a third variable area orifice, the flow areas of the second and third orifices increasing as the valve member moves in said first and second directions, respectively;
  g. means carried by the valve member and the housing defining a flow connection between the first and second motor passages and the exhaust passage containing fourth and fifth variable area orifices, respec- tively, the flow areas of the fourth and fifth orifices increasing as the valve member moves in said second and first directions, respectively; and h. means responsive to the pressure differential between the first and second control passages for shifting the valve member in the first direction when the first control passage is at the higher pressure and for shifting the valve member in the second direction when the second control passage is at the higher pressure.

2. a valve as defined in claim 1 which includes a third check valve arranged to permit flow from the exhaust passage to the inlet passage and to block flow in the reverse direction.

3. A valve as defined in claim 2 which includes a relief valve arranged to by-pass fluid from the inlet passage to the exhaust passage when the pressure in the inlet passage reaches a predetermined value.

4. A valve as defined in claim 1 in which
a. the valve member is a spool reciprocable in a valve bore formed in the housing; and
b. the means (e) defining a flow connection between the inlet and exhaust passages includes
   (1) an internal bore in the spool,
   (2) a set of radial passages formed in the spool and extending from the internal bore through the outer periphery of the spool, and
   (3) a narrow passage connected with the inlet passage and opening through the wall of the valve bore in registration with the radial passages when the spool is in neutral position,
   (4) the width of the path defined by the narrow passage and the radial passages measured in a direction parallel with the axis of the spool being so chosen with respect to its length that the direction of flow through the path is substantially normal to the spool axis.

5. A valve comprising
a. a housing containing a valve bore intersected by seven longitudinally spaced chambers, there being a central supply chamber, first and second control chambers located on opposite sides of the supply chamber, first and second motor chambers located between the supply chamber and the first and second control chambers, respectively, and first and second exhaust chambers located between the supply chamber and the first and second motor chambers, respectively;
b. an inlet passage connected with the supply chamber and an exhaust passage connected with the exhaust chamber;
c. means including first and second check valves connecting the inlet passage with the first and second control chambers, respectively, the check valves being arranged to prevent flow toward the inlet passage;
d. a reciprocable valve spool in the valve bore and being movable in first and second opposite directions from a neutral position, the opposite ends of the spool being subject to the pressures in the two control chambers;
e. centering spring means biasing the valve spool to said neutral position;
f. means carried by the valve spool and the housing defining first and second variable area orifices located, respectively, between the first control chamber and the first motor chamber and between the second control chamber and the second motor chamber, the flow areas of the first and second orifices increasing as the valve spool moves in the first and second directions, respectively;
g. means carried by the valve spool and the housing defining third and fourth variable area orifices located, respectively, between the first exhaust chamber and the first motor chamber and between the second exhaust chamber and the second motor chamber, the flow areas of the third and fourth orifices increasing as the valve spool moves in the second and first directions, respectively; and
h. an internal bore in the valve spool intersected by at least first and second radial passages, the first radial passage registering with the supply chamber when the spool is in neutral position and the flow path between the first radial passage and the supply chamber being progressively narrowed by the wall of the valve bore and the spool, respectively, as the spool moves away from the neutral position in either direction, the second radial passage being in substantially free communication with one of the exhaust chambers in all positions of the valve spool.

6. A valve as defined in claim 5 in which the width of the flow path defined by the supply chamber and the first radial passage is so selected in relation to its length that the direction of flow into the internal bore is substantially normal to the longitudinal axis of the valve spool.

7. A valve as defined in claim 6 which includes
a. a third check valve arranged to permit flow from the exhaust passage to the inlet passage and to block flow in the reverse direction; and
b. a relief valve arranged to by-pass fluid from the inlet passage to the exhaust passage when the pressure in the inlet passage reaches a predetermined value.

References Cited by the Examiner

UNITED STATES PATENTS

| | | | |
|---|---|---|---|
| 2,020,951 | 11/1935 | Lemon | 60—52 |
| 2,521,652 | 9/1950 | Rockwell | 60—52 |
| 2,608,263 | 8/1952 | Garrison | 180—79.2 |
| 2,637,303 | 5/1953 | Cintron | 60—52 |
| 2,755,625 | 7/1956 | Acton | 60—52 |
| 3,189,119 | 6/1965 | Moreno et al. | 60—52 |

M. CARY NELSON, *Primary Examiner.*

S. SCOTT, *Assistant Examiner.*